Sept. 8, 1970

C. L. MILLER 3,527,512

HIGH TEMPERATURE BEARING SEAL CONSTRUCTION

Filed Sept. 27, 1968

CORT L. MILLER
INVENTOR.

United States Patent Office 3,527,512
Patented Sept. 8, 1970

3,527,512
HIGH TEMPERATURE BEARING SEAL
CONSTRUCTION
Cort L. Miller, Webster, N.Y., assignor to Eastman
Kodak Company, Rochester, N.Y., a corporation of
New Jersey
Filed Sept. 27, 1968, Ser. No. 763,191
Int. Cl. F16c 33/26
U.S. Cl. 308—187.2                                    1 Claim

ABSTRACT OF THE DISCLOSURE

A ball or roller bearing seal comprising a pair of mating seal rings, one connected to the inner bearing race and one connected to the outer bearing race and radially overlapping. An annular poly(tetrafluoroethylene) ring is disposed in contact with and between both seal rings.

BACKGROUND OF THE INVENTION

The present invention relates to a lubricant seal for anti-friction bearings and, more particularly, to a seal which prevents the escape of a lubricant from a bearing during high temperature operation for prolonged periods of time.

Prior attempts to lubricate high speed and high temperature anti-friction bearings with wet-type lubricants such as greases have been generally unsuccessful. It is well known that grease-type lubricants provide excellent lubrication for anti-friction bearings operated under conditions of relatively low speed and low temperatures, but have several inherent disadvantages when the bearings are operated under other conditions. For example, at high temperatures, greases become less viscous and have a tendency to seep or leak from the bearing, this loss due to seepage or leakage eventually and many times very quickly resulting in a failure of the greases to provide a film of lubricant between the friction or coacting surfaces of the bearing components.

Many bearing constructions have been devised permitting use under conditions which are harmful to long bearing life. In order to permit such operation, the bearings have been provided with seals to prevent the entry of harmful substances to the ball and the races or to retain the lubricant in the bearing, preventing its escape to the surrounding atmosphere. Such arrangements have generally utilized a pair of seal members, one connected to each race and overlapping each other. These seal members form a labyrinthine path through which the flow of lubricant is restricted since these paths are sufficiently tortuous that the viscosity of the lubricant prevents it from escaping from the bearing. Other seal constructions have utilized an elastomer such as rubber, or a synthetic plastic which replaces one of the seal rings and bears on the other seal ring to provide a sliding seal through which the lubricant cannot pass.

While the foregoing seal arrangements have proved to be satisfactory under certain conditions, they have been found to be less than completely satisfactory for use at elevated temperatures. With the labyrinthine seal, it has been found that the lubricant becomes less viscous at the elevated operating temperatures so that, even though the labyrinthine path is extremely tortuous, the lubricant becomes sufficiently fluid that it still passes through the tortuous path and escapes from the bearing. With the elastomer seals, elevated temperature operation has been found to relieve the elastic load placed on the rubber ring and also to deteriorate the elastomer, both destroying the effectiveness of the seal. With the synthetic plastic materials in the shape of a seal ring, it has been found that the elevated temperature permits the synthetic material to flow or to warp out of shape and thus destroy the seal.

Thus, in many high temperature environments it has been necessary to utilize external sources of lubrication to assure satisfactory bearing life. Such lubrication of bearings has generally created a cleanliness problem whereby the area near the bearings is contaminated with the lubricant. It is apparent that such a problem is intolerable in the production of many present day products. However, until the present invention, the only alternative to the contamination of the area near these bearings was frequent replacement or re-greasing of the bearing, both of which are costly and time-consuming.

SUMMARY OF THE INVENTION

Accordingly, the present invention provides a bearing seal capable of extended operation at temperatures up to 500° F. without deterioration or leakage.

Thus, the present invention comprises a seal construction for a bearing which has an inner cylindrical race, an outer cylindrical race, and a plurality of bearing members disposed therebetween. The seal construction comprises an inner seal ring connected to and disposed inwardly from the end of the inner race, which inner seal ring has a radially outward extending flange portion. An outer seal ring is connected to and has a radially inward extending annular face portion and an axially inward extending rim portion on the inner periphery of the face portion. The face portion and the rim portion of the outer seal ring from an annular dished area which mates in spaced relation with the flange portion of said inner seal ring. An annular ring member formed of a material characterized by high anti-frictional and corrosion-resistant properties is disposed in the annular dished area of the outer seal ring. The annular ring member has a thickness at least as great as the distance between the inner seal ring flange and the annular dished area of the outer seal ring whereby a sliding contact seal is formed between the annular ring member and one of the seal rings.

More specifically, the annular ring member is formed of poly(tetrafluoroethylene) and is connected to the inner radial surface of the annular dished area of the outer seal ring.

Also, the present invention provides a seal construction for retaining lubricant in a ball bearing at elevated temperatures wherein the ball bearing comprises an inner cylindrical ball race, an outer cylindrical ball race, and a plurality of ball members disposed therebetween. The outer race is provided with an inwardly extending annular shoulder disposed inward from each end thereof and outside the ball members. The outer race also has a snap ring groove disposed between each of the shoulders and the ends thereof. An inner seal ring is disposed inward from each end of the inner race and has a pressed fit thereon. The inner seal ring has a radially outward extending flange portion and is positioned on the inner race so that the flange portion is disposed outwardly of the annular shoulder of the outer race. An outer seal ring has an outer flange portion arranged to abut the annular shoulder in the outer race and a radially inward extending face portion axially spaced outwardly from the outer flange portion. An axially inwardly extending rim portion is formed on the inner periphery of the face portion whereby the face portion and the rim portion form an annular dished area which mates in spaced axial relation with the flange portion of the inner seal ring. The distance between the inner seal ring flange and the annular dished area of the outer seal ring is less than the height of the rim portion of the outer seal ring. An annular poly(tetrafluoroethylene) ring member is connected to the inner surface of the dished area of the outer seal ring, which annular ring member has a thickness at least as great as the distance between the inner seal ring flange and the annular dished area of the outer seal ring whereby a sliding contact is formed between the inner seal ring flange and the annular ring member.

The various features of novelty which characterize the present invention are pointed out with particularity in the claim annexed to and forming a part of this specification. For a better understanding of the invention, its operating advantages and the specific objects obtained by its use, reference should be had to the accompanying drawings and descriptive matter in which the preferred embodiments of the present invention are illustrated and described.

DESCRIPTION OF THE PREFERRED EMBODIMENTS

Figure 1:
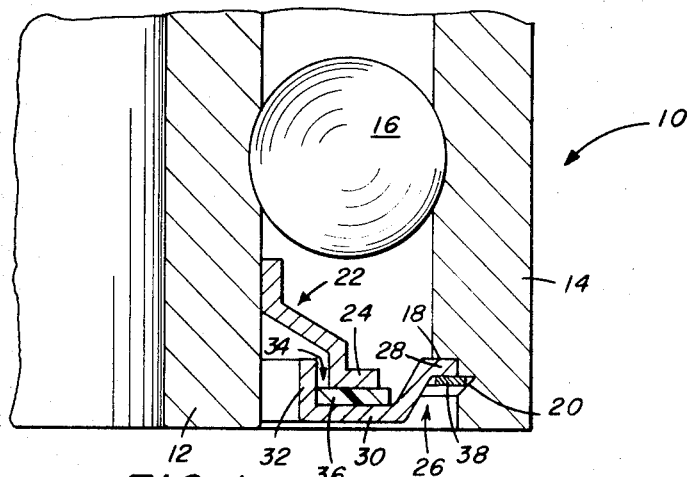
FIG. 1 illustrates a preferred embodiment of a bearing seal according to the present invention as utilized in a ball bearing, a portion of which is shown in section.

The preferred embodiment of the present seal construction for retaining lubricant in a ball bearing 10 at elevated temperatures is shown in FIG. 1. The bearing comprises an inner cylindrical ball race 12, an outer cylindrical ball race 14, and a plurality of ball members 16 disposed therebetween. The inner surface of the outer race has an inwardly extending annular shoulder 18 disposed inward from each end thereof and outside said ball members. The outer race also has a snap ring groove 20 disposed between each of the shoulders and the corresponding end thereof.

The seal construction comprises a metal inner seal ring 22 disposed inwardly from each end of the innner race 12 and having a pressed fit thereon. The inner seal ring has a radially outwardly extending flange portion 24 having a radial dimension less than the distance between the inner and the outer races. The inner seal ring 22 is so positioned on the inner race that the flange portion 24 is disposed axially outward from the annular shoulder 18 of said outer race. A metal outer seal ring 26 has an outer flange portion 28 arranged to abut the annular shoulder 18 in the outer race. The outer seal ring has a radially inward extending annular face portion 30 spaced axially outward from the outer flange portion 28 and an axially inward extending rim portion 32 on the inner periphery of the face portion. The face portion 30 and the rim portion 32 thus form an annular dished area, generally indicated at 34, which mates in spaced relation with the flange portion 24 of the inner seal ring 22. The distance between the outer surface of the inner seal ring flange portion 24 and the annular dished area 34 of the outer seal ring 26 is preferably less than the height of the rim portion 32 of the outer seal ring. An annular ring member 36 is disposed between the flange portion 24 and the dished area 34. Preferably, the ring member is connected to the innner radial surface of the annular dished area 34 of the outer seal ring. The annular ring member 36 is formed of a material characterized by high antifrictional and corrosion resistant properties. Specifically, it has been found to be desirable to form the ring members of polymers of fluorinated hydrocarbons such as poly(tetrafluoroethylene), and known by the trade name "Teflon." The annular ring member 36 has a thickness at least as great as the distance between the inner seal ring flange portion 24 and the annular dished area 34 of the outer seal ring 26 whereby a sliding contact is formed between the inner seal ring flange and the annular ring member. Preferably, the inner and outer seal rings are axially located so that the inner seal ring is pressed against the "Teflon" ring member. A retainer ring 38 fits within the snap ring groove 20 to hold the outer seal ring in place.

Figure 2:
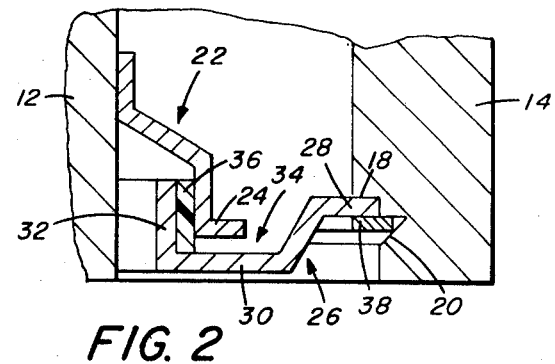
FIG. 2 shows a detail of a bearing seal according to an alternate embodiment of the present invention.

In the alternate embodiment illustrated in FIG. 2, the construction of the seal is similar to that in FIG. 1, and similar reference members refer to similar parts. In this arrangement, however, the annular ring member 36 is disposed between the rim portion 32 of the outer seal ring 26 and the axially extending portion of the inner seal ring 22. Thus, the force between the seal member and the annular ring member is radial rather than axial, and is provided by the resilience of the seal rings.

It will be appreciated that, while the present seal arrangement has been illustrated in combination with a ball bearing, it will operate equally satisfactory with other types of rotary bearings.

It has been found that the present combination of a "Teflon" ring pressed between a pair of metal seal rings, with relative motion occurring between one of the seal rings and the "Teflon" ring provides superior sealing characteristics at high temperature bearing operating conditions. This apparently occurs because the "Teflon" ring is supported by both seal rings and is thus not easily distorted out of sealing contact by bearing end play or other factors. Moreover, it has been found that the inherently low coefficient of friction of "Teflon," and the fact that it will "flow" under a load, such as the axial force between the mating seal rings, creates an exceptionally effective low friction seal. Moreover, "Teflon" has a coefficient of expansion approximately six times that of steel so that, at elevated temperatures, the metal seal rings will not expand apart to a greater extent than the expansion of the "Teflon" so that the "Teflon" ring maintains a tight, uniform contact seal with the seal ring moving relative to the surface thereof.

The invention has been described in detail with particular reference to preferred embodiments thereof, but it will be understood that variations and modifications can be effected within the spirit and scope of the invention.

I claim:
1. A seal construction for retaining lubricant in a bearing at elevated temperatures, said bearing comprising an inner cylindrical race, an outer cylindrical race, and a plurality of bearing members disposed therebetween, said outer race having an inwardly extending annular shoulder disposed inward from each end thereof and outside said bearing members, said outer race having a snap ring groove disposed between each of said shoulders and the corresponding end thereof, said seal construction comprising a resilient metal inner seal ring disposed inwardly from each end of the inner race and having a pressed fit thereon, said inner seal ring having a radially outwardly extending flange portion, said inner seal ring positioned on said inner race with the flange portion disposed axially outward from the annular shoulder of said outer race, a resilient metal outer seal ring having an outer flange portion arranged to abut said annular shoulder in said outer race, said outer seal ring having a radially inward extending annular face portion spaced axially outward from the outer flange portion and an axially inward extending rim portion on the inner periphery of said face portion, said face portion and said rim portion forming an annular dished area which mates in axially spaced relation with said flange portion of said inner seal ring, the distance between said inner seal ring flange and the annular dished area of the outer seal ring being less than the axial length of the rim portion of the outer seal ring, and an annular ring member disposed in the annnular dished area of the outer seal ring and having a thickness at least as great as the distance between said inner seal ring flange and the annular dished area of the outer seal ring whereby a sliding contact is formed at least between the inner seal ring flange and the annular ring member, said annular ring member being formed of poly (tetrafluoroethylene) possessing a relatively high coefficient of thermal expansion and coacting in sealing engagement with the resilient inner and outer seal rings whereby the expansion of said annular ring member at high temperatures maintains the sealing engagement thereof with said inner and outer seal rings, and the contraction of said annular ring member at low temperatures is compensated for the resilience of said seal rings thereby maintaining a seal over a wide temperature range.

References Cited

UNITED STATES PATENTS

| | | | |
|---|---|---|---|
| 1,420,416 | 6/1922 | Dlesk | 308—36.1 X |
| 1,986,621 | 1/1935 | Bott | 308—187.2 |
| 2,250,167 | 7/1941 | Niles | 308—187 |
| 2,277,810 | 3/1942 | Zotter | 308—187.2 |
| 3,010,771 | 11/1961 | Cogger | 308—187.2 |
| 3,101,954 | 8/1963 | Huddle | 308—187.2 |
| 3,245,735 | 4/1966 | Sikora | 308—187.1 |
| 3,363,911 | 1/1968 | McKinven | 277—82 X |
| 3,428,375 | 2/1969 | Martin | 308—187.2 |

FOREIGN PATENTS

| | | |
|---|---|---|
| 1,376,251 | 12/1964 | France. |
| 907,143 | 10/1962 | Great Britain. |

WESLEY S. RATLIFF, JR., Primary Examiner

U.S. Cl. X.R.

277—95